Dec. 23, 1924.
G. C. APPEL
COMBINATION TOOL
Filed Aug. 17, 1922
1,520,670
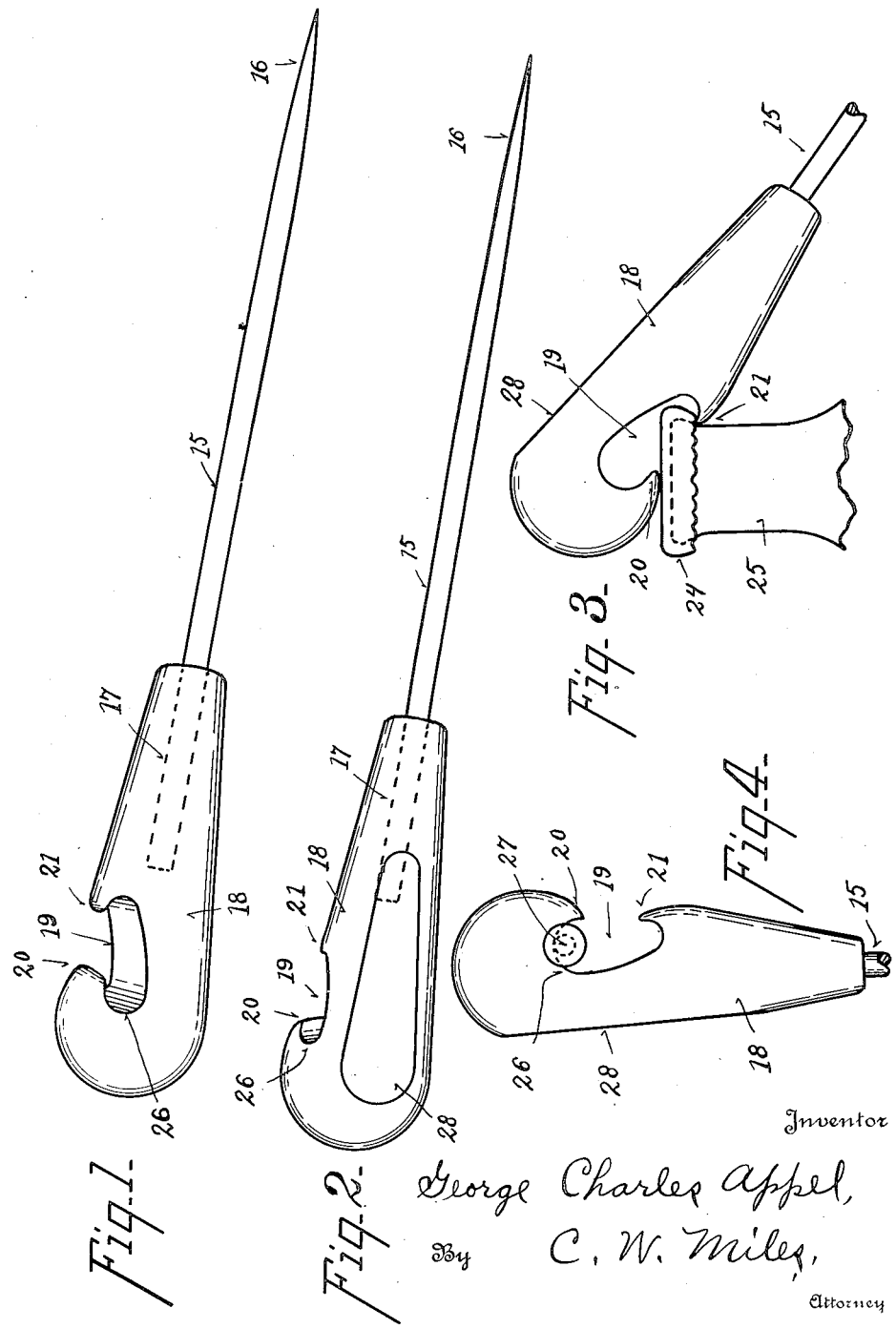

Patented Dec. 23, 1924.

1,520,670

UNITED STATES PATENT OFFICE.

GEORGE CHARLES APPEL, OF NEWPORT, KENTUCKY, ASSIGNOR OF ONE-HALF TO JOSEPH WEBB, OF CINCINNATI, OHIO.

COMBINATION TOOL.

Application filed August 17, 1922. Serial No. 582,509.

*To all whom it may concern:*

Be it known that I, GEORGE CHARLES APPEL, a citizen of the United States, residing at Newport, in the county of Campbell and State of Kentucky, have invented certain new and useful Improvements in Combination Tools, of which the following is a specification.

My invention relates to improvement in combination tools. One of its objects is to provide an improved tool adapted to serve as an ice-pick, and also as a means to crush ice. Another object is to provide a combination tool adapted to serve as an ice-pick and a bottle uncapper. Another object is to provide a combination tool adapted to serve as an ice-pick, a bottle uncapper, and an ice crusher, and which is also adapted to be conveniently suspended from a nail or hook when not in use. My invention also comprises certain details and combination of components, all of which will be fully set forth in the description of the accompanying drawings, in which:
Fig. 1 is a perspective view of my improved combination tool;

Fig. 2 is a perspective view of the same exposing the opposite side from that shown in Fig. 1;
Fig. 3 is a detail illustrating the application of the tool to uncapping bottles; and Fig. 4 is a detail illustrating the manner of suspending the tool when not in use.

The accompanying drawings illustrate the preferred embodiment of my invention, in which 15 represents a cylindrical rod of tempered steel, tapered and pointed at one end 16 to serve as an ice-pick.

The shank 17 of the member 15 is firmly seated in a handle member 18 preferably of some heavy rigid metal, such as cast iron or brass for instance, so as to give weight to the handle member 18, and adapt it to be used as a hammer to fracture or crush ice, using the member 15 as a hammer handle. The member 18 should be of a metal or alloy of sufficient rigidity so as to retain its shape, and not be liable to fracture from the shocks and strains incident to its ordinary use.

The handle member 18 is provided with a recess 19, with projections 20 and 21 at opposite sides of said recess. The projections 20 and 21 and recess 19 are utilized as illustrated in Fig. 3, in connection with leverage exerted through the members 15 and 18 to pry the caps 24 from the mouths of bottles 25. The end 26 of the recess 19 in connection with the projection 20 provides for readily suspending the tool upon a nail or hook 27 when not required for use. The handle member 18 is preferably provided with a substantially flat or plane surface 28 which serves to prevent the tool from rolling about, as for instance upon a table or sink-board, even where the surface is somewhat inclined. The surface 28 or other portion of the handle member may be utilized for advertising purposes if desired. The entire tool is preferably plated or coated so as to render its exterior substantially non-corrosive. In practice the finished and pointed member 15 is placed in a mold and the handle member cast upon and about the shank 17 of said member 15 to firmly unite the handle 18 to the pick 15 and at the same time to shape and complete the member 18 ready to be polished and plated.

The article herein shown and described is capable of considerable modification within the scope of the claims without departing from the spirit of my invention.

What I claim is:

1. A combination tool comprising a pick member adapted to be employed as an ice-pick, a weighted handle member rigidly attached to said pick member and adapted to be employed to crush ice, there being a recess entering from one side of said handle member with projections at opposite sides of said recess adapted to be utilized to uncap bottles and to suspend the tool in an idle position.

2. A combination tool comprising a pick member adapted to be employed as an ice-pick, a metal handle member cast about one end of said pick-member, there being a recess entering from one side of said handle member with projections at opposite sides of said recess adapted to be utilized to uncap bottles and to suspend the tool in an idle position.

3. A combination tool comprising a pick member adapted to be employed as an ice-pick, a weighted handle member rigidly attached to said pick member and adapted to be employed to crush ice, there being a recess entering from one side of said handle member with projections at opposite sides of said recess adapted to be utilized to uncap bottles and to suspend the tool in an idle position, and a substantially plane face on said handle member adapted to prevent said tool from rolling about.

In testimony whereof I have affixed my signature.

GEORGE CHARLES APPEL.